United States Patent
Frankel et al.

(10) Patent No.: US 9,498,756 B2
(45) Date of Patent: Nov. 22, 2016

(54) ASSEMBLY FOR WASTEWATER TREATMENT

(71) Applicants: Thomas E. Frankel, Poughkeepsie, NY (US); Seoungil Kang, Poughkeepsie, NY (US); Todd D. Ritter, Poughkeepsie, NY (US)

(72) Inventors: Thomas E. Frankel, Poughkeepsie, NY (US); Seoungil Kang, Poughkeepsie, NY (US); Todd D. Ritter, Poughkeepsie, NY (US)

(*) Notice: Subject to any disclaimer, the term of this patent is extended or adjusted under 35 U.S.C. 154(b) by 91 days.

(21) Appl. No.: 14/582,960

(22) Filed: Dec. 24, 2014

(65) Prior Publication Data
US 2016/0184780 A1 Jun. 30, 2016

(51) Int. Cl.
*B01F 3/04* (2006.01)
*C02F 3/20* (2006.01)

(52) U.S. Cl.
CPC ......... *B01F 3/0412* (2013.01); *B01F 3/04241* (2013.01); *B01F 3/04269* (2013.01); *C02F 3/208* (2013.01); *B01F 2003/04177* (2013.01); *B01F 2003/04276* (2013.01); *B01F 2003/04297* (2013.01); *B01F 2003/04304* (2013.01)

(58) Field of Classification Search
CPC .............. B01F 3/0412; B01F 3/04269; B01F 3/04241; B01F 2003/04297; B01F 2003/04276; B01F 2003/04304; B01F 2003/04177
See application file for complete search history.

(56) References Cited

U.S. PATENT DOCUMENTS

| | | | | |
|---|---|---|---|---|
| 2,639,131 A * | 5/1953 | Coombs | B01F 3/04262 | 210/220 |
| 3,532,272 A * | 10/1970 | Branton | B01F 3/0412 | 118/50 |
| 3,953,555 A * | 4/1976 | Gley | B01F 3/0412 | 239/542 |
| 4,007,240 A * | 2/1977 | Gosden | B01F 3/0412 | 210/220 |
| 4,046,845 A * | 9/1977 | Veeder | B01F 3/04262 | 239/145 |
| 4,218,407 A * | 8/1980 | Robertson | B01F 3/04241 | 137/854 |
| 4,288,394 A * | 9/1981 | Ewing | B01F 3/04262 | 137/852 |
| 4,764,314 A * | 8/1988 | Schneider | B01F 3/04269 | 137/854 |
| 4,889,620 A * | 12/1989 | Schmit | B01F 3/0412 | 134/170 |
| RE33,177 E * | 3/1990 | Schmit | B01F 3/0412 | 134/170 |
| 5,015,421 A * | 5/1991 | Messner | B01F 3/04241 | 160/380 |
| 5,075,048 A * | 12/1991 | Veeder | B01F 3/0412 | 261/122.1 |
| 5,158,715 A * | 10/1992 | Jager | B01F 3/04269 | 261/122.1 |
| 5,204,028 A * | 4/1993 | Ruston | B01F 3/04262 | 261/122.1 |
| 5,330,688 A * | 7/1994 | Downs | B01F 3/0412 | 261/122.1 |
| 5,352,391 A * | 10/1994 | Heck | B01F 3/04269 | 160/380 |

(Continued)

FOREIGN PATENT DOCUMENTS

DE 3600234 A1 * 7/1987 ......... B01F 3/04269
DE 19546675 A1 6/1997

OTHER PUBLICATIONS

ThomasNet "Types of Fastener Threads" published Mar. 1, 2013 and viewed online at <https://web.archive.org/web/20130301022112/http://www.thomasnet.com/articles/hardware/fastener-threads>.*

*Primary Examiner* — Amber R Orlando
*Assistant Examiner* — Stephen Hobson
(74) *Attorney, Agent, or Firm* — Law Offices of Michael L. Wise, LLC

(57) ABSTRACT

An apparatus comprises a distribution conduit, a diffuser body, and an insert. The distribution conduit defines an aperture. The diffuser body defines a mating tube, at least a portion of the mating tube passing through the aperture, and the mating tube defining a mating tube passage therethrough with an inside sidewall. The insert is at least partially disposed in the mating tube passage and presses against the inside sidewall so as to cause the mating tube to expand. Removal of the mating tube from the distribution conduit is thereby inhibited.

17 Claims, 8 Drawing Sheets

(56) References Cited

U.S. PATENT DOCUMENTS

| | | | | |
|---|---|---|---|---|
| 5,458,771 A * | 10/1995 | Todd | B01F 3/04269 | 119/263 |
| 5,676,890 A * | 10/1997 | Ott | B01F 3/0412 | 261/122.2 |
| 5,705,063 A * | 1/1998 | Lee | B01F 3/04269 | 210/220 |
| 5,788,847 A * | 8/1998 | Tharp | B01F 3/04269 | 210/220 |
| 5,888,391 A * | 3/1999 | Meshengisser | B01F 3/0412 | 210/220 |
| 6,464,211 B1 * | 10/2002 | Downs | B01F 3/04241 | 261/122.1 |
| 7,681,867 B2 * | 3/2010 | Hu | B01F 3/04269 | 261/122.1 |
| 8,002,248 B2 * | 8/2011 | Hu | B01F 3/04269 | 261/122.1 |
| 8,020,839 B2 | 9/2011 | Smiltneek et al. | | |
| 8,657,268 B2 | 2/2014 | Smiltneek et al. | | |
| 2002/0033544 A1 * | 3/2002 | Jager | B01F 3/0412 | 261/122.1 |
| 2003/0192817 A1 * | 10/2003 | Frankel | B01F 3/0412 | 210/220 |
| 2006/0226260 A1 * | 10/2006 | Jager | B01F 3/0412 | 239/398 |
| 2008/0135648 A1 * | 6/2008 | Smiltneek | B01F 3/0412 | 239/557 |
| 2011/0132847 A1 * | 6/2011 | Smiltneek | B01F 3/0412 | 210/758 |
| 2012/0061862 A1 * | 3/2012 | Tharp | B01F 3/04269 | 261/122.1 |
| 2013/0214438 A1 * | 8/2013 | Takano | B01F 3/04241 | 261/112.1 |

* cited by examiner

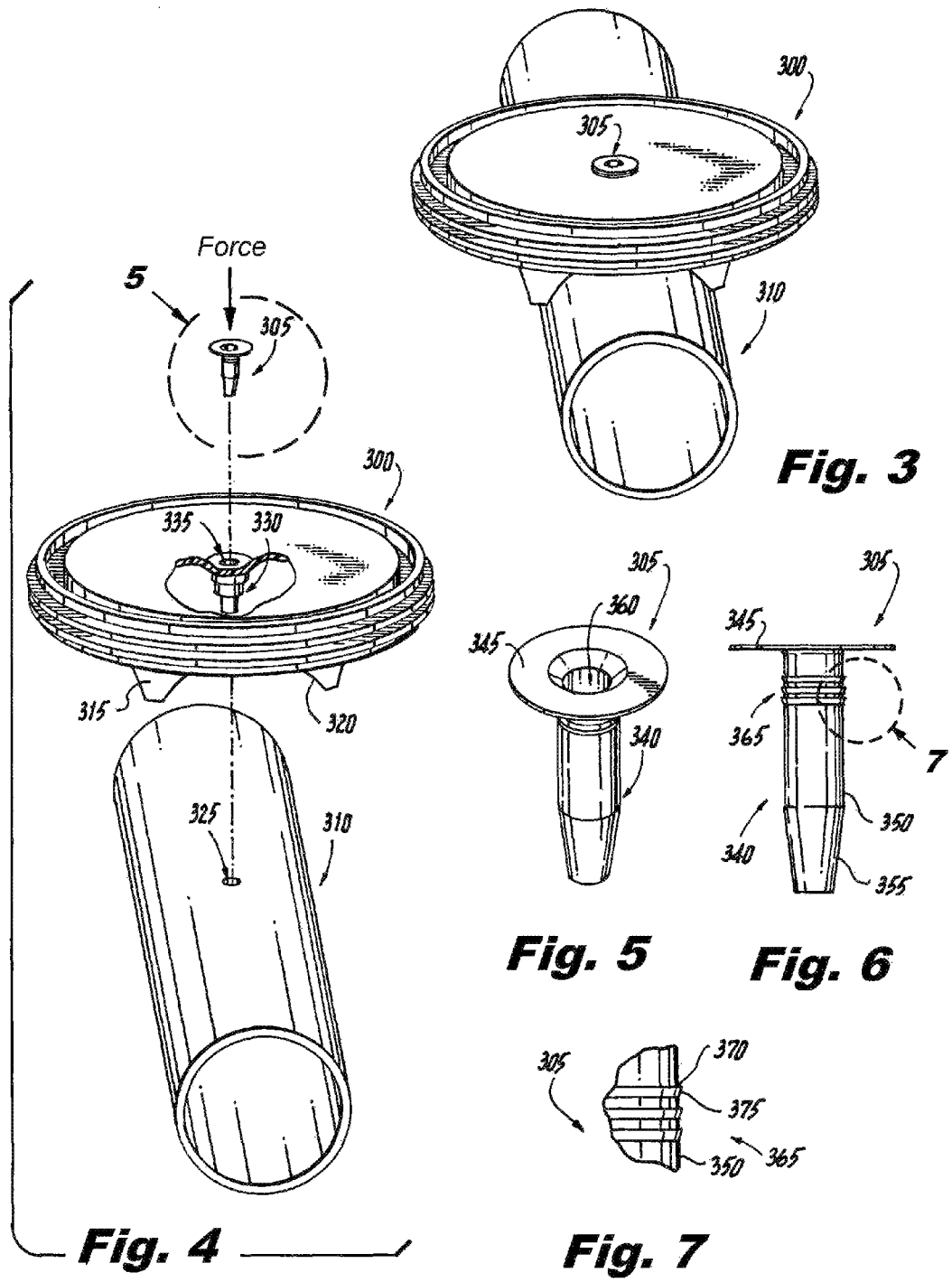

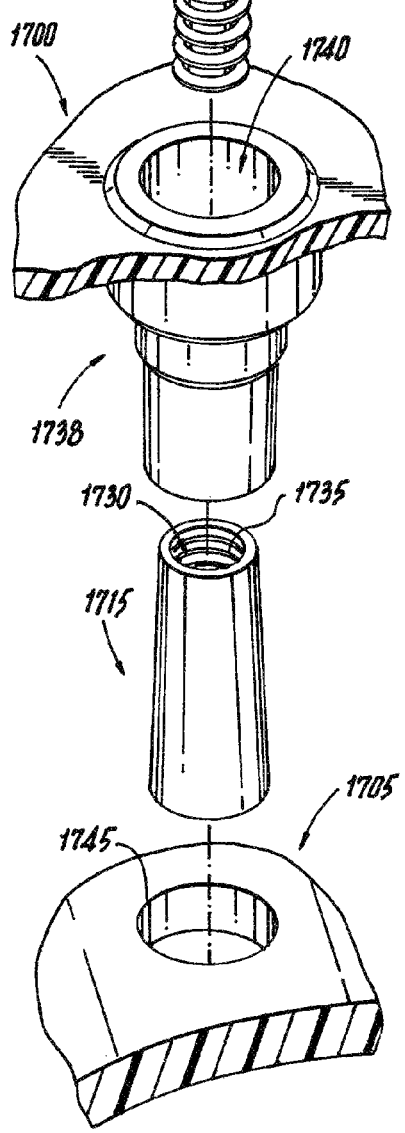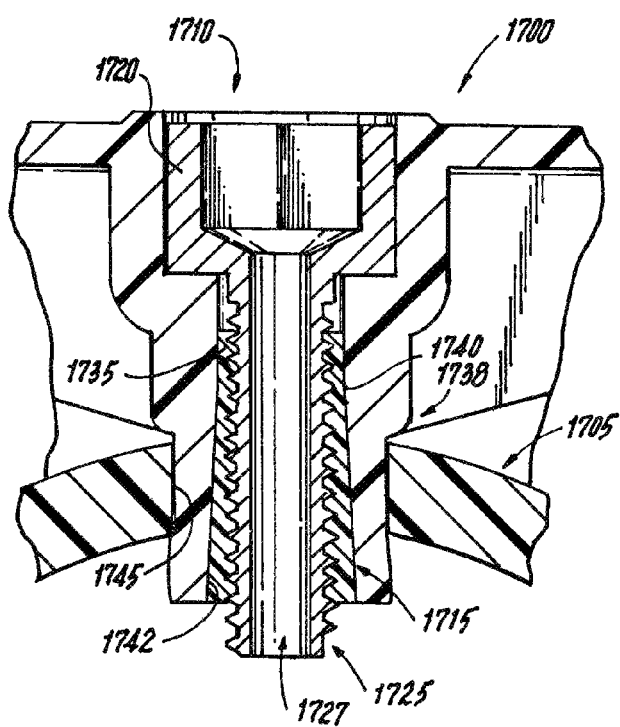
Fig. 17
Fig. 18

ASSEMBLY FOR WASTEWATER TREATMENT

FIELD OF THE INVENTION

The present invention relates generally to wastewater treatment, and, more particularly, to diffuser assemblies for use in wastewater treatment.

BACKGROUND OF THE INVENTION

Flexible diffusers are conventionally used to support aerobic biological processes in wastewater treatment plants. A flexible diffuser typically comprises a disc-, tube-, or strip-shaped membrane that is constructed of rubber or other similar materials, which is punctured to provide a number of perforations in the form of holes or slits. In operation, pressurized air is sent through these perforations to create a plume of small bubbles. The bubbles rise through the wastewater and provide the surrounding wastewater with the oxygen needed to sustain the desired biological processes occurring therein.

FIG. 1 shows a partially-broken side perspective view of a fine bubble diffuser assembly 100 that is conventionally used in modern wastewater treatment facilities for "submerged" treatment of the wastewater. Wastewater treatment with such assemblies is described in, as just one example, F. L. Burton, *Wastewater Engineering* (McGraw-Hill College, 2002), which is hereby incorporated by reference herein. When in use, a plurality of diffuser assemblies is arrayed on several lateral distribution conduits that cross a wastewater treatment tank. Diffuser assemblies may, for example, be placed every foot along a given lateral distribution conduit. A blower located near the tank sends compressed air to the lateral distribution conduits via several support pipes (e.g., drop pipes and manifold pipes).

In the diffuser assembly 100, a flexible diffuser membrane 110 sits atop a diffuser body 120. The diffuser body 120 comprises a threaded mating tube 130, an air inlet orifice 140, and a receiving surface 150 for coupling to a retainer ring 160. The retainer ring 160 holds the flexible diffuser membrane 110 against the diffuser body 120. When gas is applied to the flexible diffuser membrane 110 through the air inlet orifice 140, the gas pressure expands the flexible diffuser membrane 110 away from the diffuser body 120 and causes the membrane's perforations to open so that the gas discharges through them in the form of fine bubbles. When the gas pressure is relieved, the flexible diffuser membrane 110 collapses on the diffuser body 120 to close the perforations and prevent the liquid from entering the diffuser body 120 in the opposite direction. Generally, a flexible diffuser membrane 110 configured in this way produces bubbles smaller than five millimeters in diameter. The resultant large ratio of surface area to volume in these bubbles promotes efficient oxygen mass transfer between the bubbles and the surrounding wastewater. The fine bubbles also cause an upward movement in the wastewater tank, which helps to keep solid waste in suspension and to mix the contents of the tank.

A typical wastewater treatment tank may include 2,000 diffuser assemblies and their associated distribution conduits. Because of this large number, the ease in which the diffuser assemblies are mounted (i.e., mated) to the distribution conduits becomes a large factor in determining labor needs and, ultimately, installation costs. One such mounting method, for example, comprises the use of a clam-shell device or saddle that encircles the distribution conduit and provides a mounting point for the diffuser assembly. FIG. 2 shows such a saddle 200 on a distribution conduit 210 with a diffuser assembly 220. To install the diffuser assembly 220, a hole is first drilled in the distribution conduit 210 where the diffuser assembly 220 is to be placed, and then the saddle 200 is encircled about the distribution conduit 210 overlying the aperture and tightened by hammering in a wedge 230. The diffuser assembly 220 is then attached to the top of the saddle 200. Watertight seals are ensured using two internal rubber O-rings (not shown). Another mounting method comprises the solvent welding of a plastic diffuser base to a plastic distribution conduit. The diffuser base and distribution conduit may, for instance, be formed of polyvinylchloride. A bead of resin around the solvent weld further ensures a watertight seal.

Nevertheless, while these mounting techniques are generally effective and are in widespread usage, they tend to be labor intensive and require the presence of a skilled foreman and a semi-skilled crew, which are costly and are not always readily available. These techniques are therefore not always conducive to quick repairs without a lot of prior notice. Accordingly, it is desirable to obtain alternative means of mounting diffuser assemblies to distribution conduits that are less labor intensive than prior art means. Ideally, these alternative mounting means may be performed by less skilled labor, while still providing the same level of reliability in use.

SUMMARY OF THE INVENTION

Embodiments of the present invention address the above-identified needs by providing diffuser assemblies that are easily mated to distribution conduits in wastewater treatment applications.

Aspects of the invention are directed to an apparatus comprising a distribution conduit, a diffuser body, and an insert. The distribution conduit defines an aperture. The diffuser body defines a mating tube, at least a portion of the mating tube passing through the aperture, and the mating tube defining a mating tube passage therethrough with an inside sidewall. The insert is at least partially disposed in the mating tube passage and presses against the inside sidewall so as to cause the mating tube to expand. Removal of the mating tube from the distribution conduit is thereby inhibited.

Additional aspects of the invention are directed to an apparatus for use in combination with a distribution conduit defining an aperture. The apparatus comprises a diffuser body and an insert. The diffuser body defines a mating tube, which defines a mating tube passage therethrough with an inside sidewall. At least a portion of the mating tube is adapted to pass through the aperture. The insert is adapted to be at least partially disposed in the mating tube passage with at least a portion of the mating tube passing through the aperture, and to press against the inside sidewall so as to cause the mating tube to expand such that removal of the mating tube from the distribution conduit is inhibited.

Even more aspects of the invention are directed to a method for mounting a diffuser body on a distribution conduit having an aperture. A diffuser body is provided, the diffuser body defining a mating tube, which defines a mating tube passage therethrough with an inside sidewall. At least a portion of this mating tube is passed through the aperture. An insert is then inserted into the mating tube such that the insert presses against the inside sidewall so as to cause the mating tube to expand against the aperture and inhibit removal of the mating tube from the distribution conduit.

Advantageously, embodiments in accordance with aspects of the invention allow diffuser assemblies to be readily mounted in the field with just a few parts and by labor less skilled than that needed to mount conventional diffuser assemblies. Embodiments in accordance with aspects of the invention may be utilized as a principle method of mounting diffuser assemblies to distribution conduits when wastewater treatment systems are being installed, and/or as a method of quickly replacing diffuser assemblies in existing systems when defects are discovered.

BRIEF DESCRIPTION OF THE DRAWINGS

These and other features, aspects, and advantages of the present invention will become better understood with regard to the following description, appended claims, and accompanying drawings where:

FIG. 3 shows a perspective view of a diffuser body mounted to a distribution conduit using an insert, in accordance with an illustrative embodiment of the invention;

FIG. 4 shows a partially-broken exploded perspective view of the FIG. 3 elements;

FIG. 5 shows a perspective view of the FIG. 3 insert;

FIG. 6 shows a side elevational view of the FIG. 3 insert;

FIG. 7 shows a magnified side elevational view of the portion of the region indicated in FIG. 6;

FIG. 17 shows a partially-broken exploded perspective view of a diffuser body mounted to a distribution conduit utilizing a two-part insert, in accordance with even another illustrative embodiment of the invention;

FIG. 18 shows a sectional view of the FIG. 17 elements;

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

Figure 1:
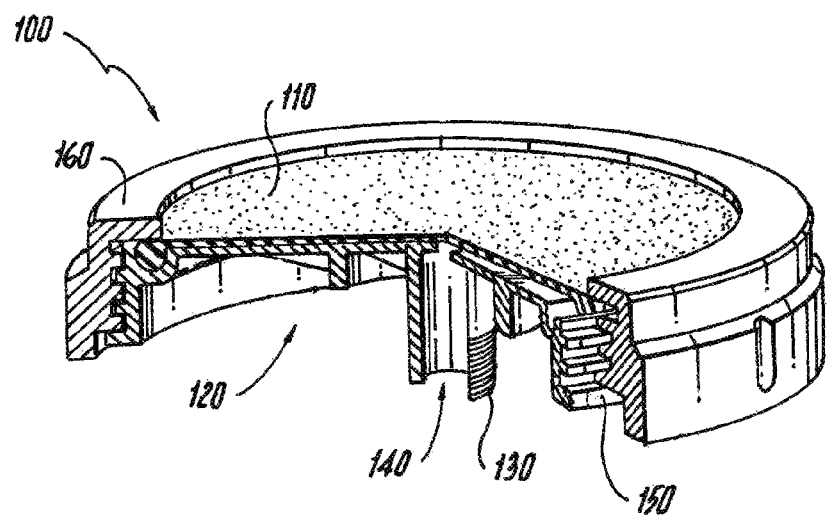
FIG. 1 shows a perspective view of a conventional diffuser assembly.
Figure 2:
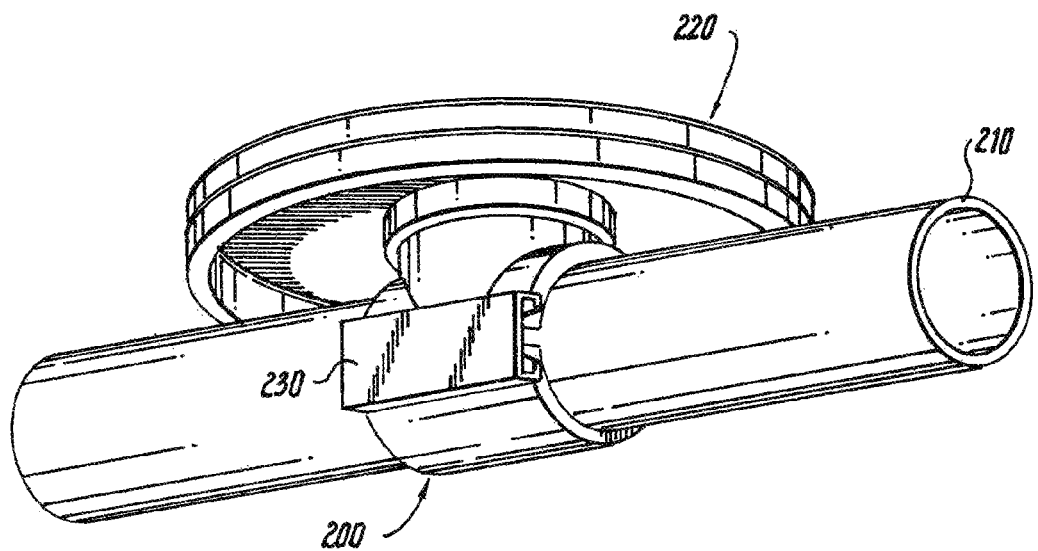
FIG. 2 shows a perspective view of a conventional clam-shell device utilized to mount a diffuser assembly to a distribution conduit.

FIGS. 3 and 4 show aspects of a diffuser body 300, an insert 305, and a distribution conduit 310, in accordance with an illustrative embodiment of the invention. FIG. 3 shows a perspective view of the diffuser body 300 mounted to the distribution conduit 310 using the insert 305, while FIG. 4 shows a partially-broken exploded perspective view of the same elements. The diffuser body 300 is operative to support a diffuser membrane in a manner similar to the conventional diffuser body 120 shown in FIG. 1. A flexible diffuser membrane like the flexible diffuser membrane 110 may be attached to the diffuser body 300 using a retainer ring like the retainer ring 160 to form a complete diffuser assembly. With the diffuser assembly attached to the distribution conduit 310 at the bottom of a wastewater treatment tank, pressurized air may be provided to the diffuser assembly by the distribution conduit 310 to cause the diffuser assembly to produce a plume of bubbles.

The diffuser body 300 defines a pair of anti-torque projections 315 that project downward from the diffuser body 300. The anti-torque projections 315 define peripheral edges 320, which conform to the outside contour of the distribution conduit 310. When these peripheral edges 320 are placed against the distribution conduit 310 in the manner shown in FIG. 3, they act to restrict the diffuser body 300 from rotating relative to the distribution conduit 310.

The connection between the diffuser body 300 and the distribution conduit 310 is via an aperture 325 in the distribution conduit 310. A mating tube 330 of the diffuser body 300 passes through this aperture 325 so that a portion of the mating tube 330 occupies the inside of the distribution conduit 310. The insert 305 is then forcibly inserted into a mating tube passage 335 that passes vertically through the mating tube 330. The insert 305 presses against an internal sidewall of the mating tube passage 335, which causes the mating tube 330 to expand against and just below the aperture 325. Removal of the mating tube 330 from the aperture 325 is thereby inhibited. In other words, with the insert 305 properly seated in the mating tube 330, the diffuser body 300 is strongly fixated to the distribution conduit 310.

These dynamics are further explained with reference to FIGS. 5-10. FIG. 5 shows a perspective view of the insert 305, while FIG. 6 shows a side elevational view thereof, and FIG. 7 shows a magnified side elevational view of the portion of the insert 305 indicated in FIG. 6. The insert 305 comprises a cylindrical body 340 that is topped by a flange 345. As the insert 305 is oriented in the figures, approximately the upper five-eighths of the cylindrical body 340 defines a vertical external sidewall 350, while the remaining lower three-eighths of the cylindrical body 340 is tapered with a tapered external sidewall 355. The tapering causes the outer diameter of the lower portion of the cylindrical body 340 to become gradually smaller as one moves downward. An insert channel 360 passes vertically through the insert 305. The insert channel 360 is dimensioned to provide the desired conductance. Finally, the insert 305 further defines a set of protruding retaining ridges 365. These retaining ridges 365 are angled so that each retaining ridge 365 defines a respective upward-facing surface 370 and a respective downward-facing surface 375. The upward-facing surfaces 370 are oriented substantially normal to the vertical external sidewall 350, while the downward-facing surfaces 375 are angled at about 30-degrees with respect to the vertical external sidewall 350.

Figure 8:
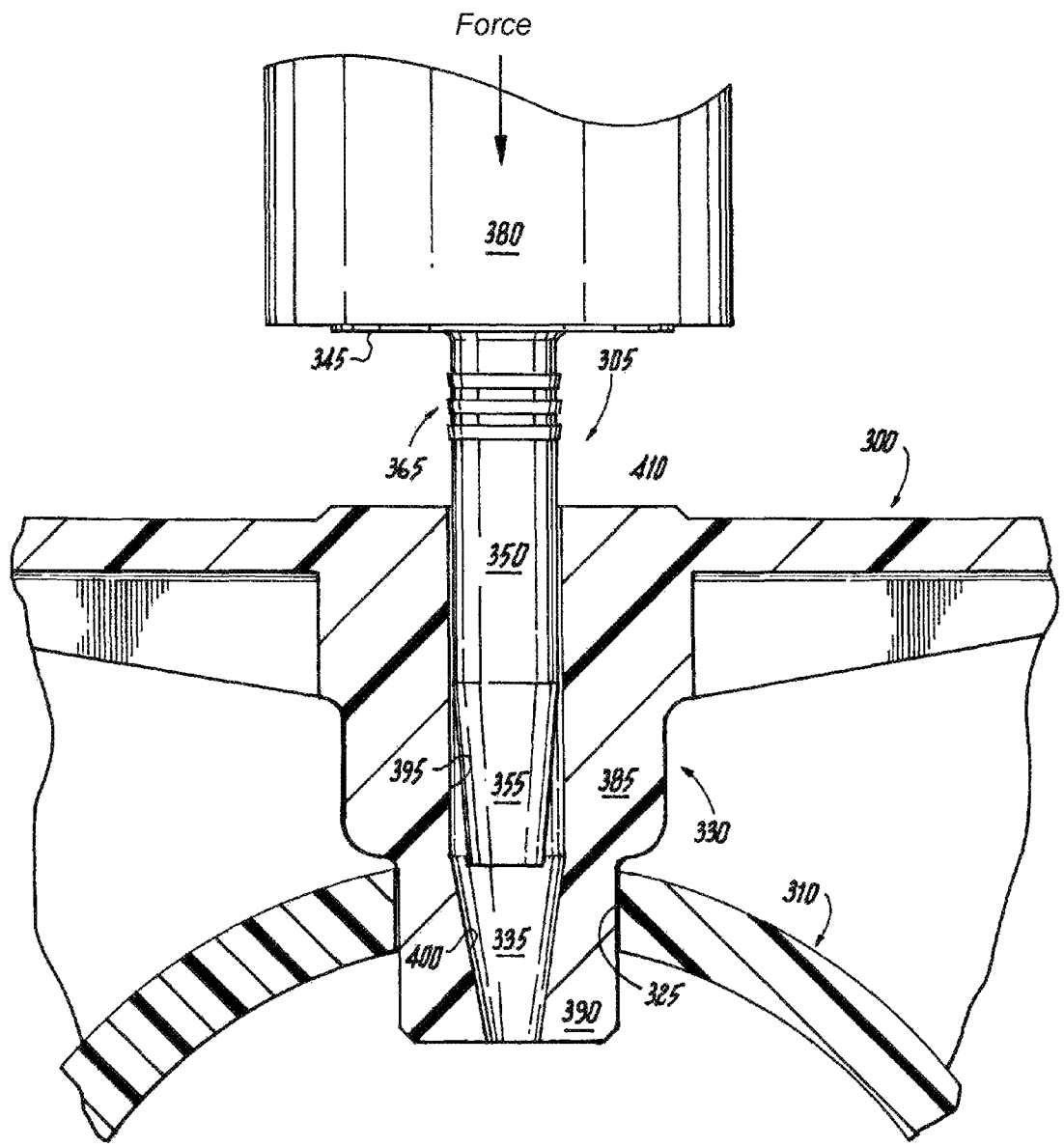
FIG. 8 shows a partially-broken side elevational view of the FIG. 3 elements with the insert not fully seated.
Figure 9:
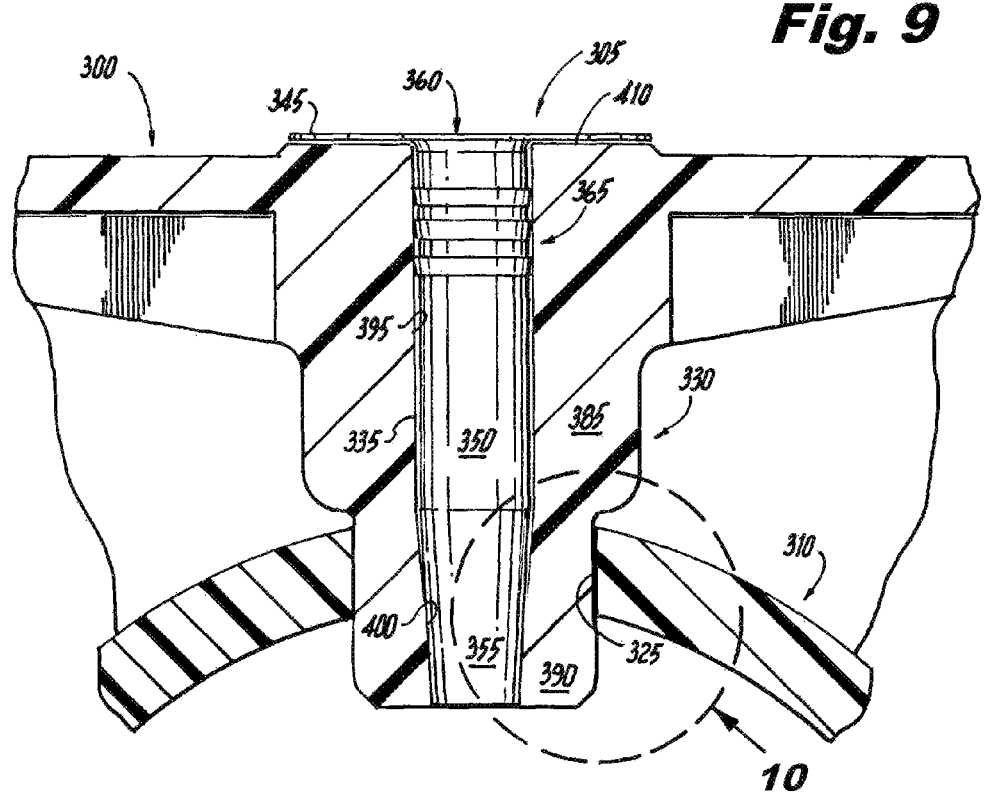
FIG. 9 shows a partially-broken side elevational view of the FIG. 3 elements with the insert fully seated.
Figure 10:
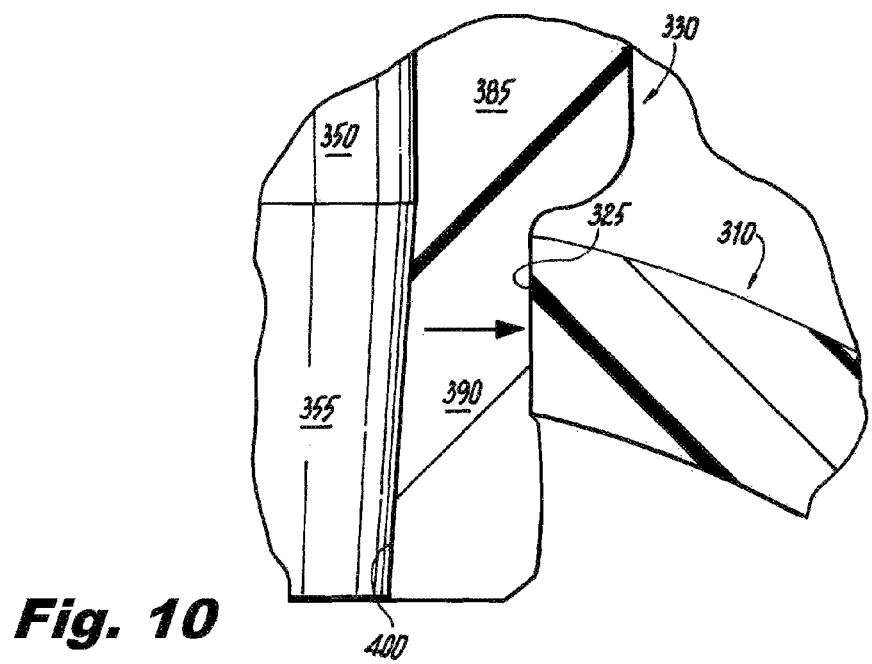
FIG. 10 shows a magnified partially-broken side elevational view of the region indicated in FIG. 9.

FIG. 8 shows a partially-broken side elevational view of the diffuser body 300, the insert 305, and the distribution conduit 310 with the mating tube 330 inserted into the aperture 325 of the distribution conduit 310. In this figure, the insert 305 is only partly inserted into the mating tube passage 335 (i.e., the insert 305 is only partially seated) and a force is being applied thereto by a forcing means 380 (e.g., a hammer). FIG. 9 shows a partially-broken side elevational view of the same elements with the insert 305 fully seated. FIG. 10 shows a magnified partially-broken side elevational view of the region indicated in FIG. 9.

The exterior of the mating tube 330 defines two portions: a proximal portion 385 and a distal portion 390. In the present, non-limiting embodiment, both portions 385, 390 are cylindrical. The proximal portion 385 emerges from the remainder of the diffuser body 300, and has a larger outside diameter than the distal portion 390. The outside diameter of the proximal portion 385 is too large to fit through the aperture 325 in the distribution conduit 310. In contrast, as long as the insert 305 is not fully seated in the mating tube passage 335, the distal portion 390 of the mating tube 330 has a diameter slightly smaller than the diameter of the aperture 325. Accordingly, the distal portion 390 of the mating tube 330 may be inserted into the aperture 325 with little effort.

The mating tube passage 335 inside the mating tube 330 describes a volume having a shape somewhat similar to that of the cylindrical body 340 of the insert 305. In fact, because of the manner in which the mating tube passage 335 and the insert 305 interact with each other, the dimensions of the mating tube passage 335 are directly related to the dimensions of the insert 305. About the upper five-eighths of the mating tube passage 335 is contained within the proximal portion 385 of the mating tube 330, and has a vertical internal sidewall 395. This upper vertical-walled portion of the mating tube passage 335 has a length and diameter about equal to those of the upper vertical-walled portion of the insert 305. At the same time, about the lower three-eighths of the mating tube passage 335 is contained within the narrower distal portion 390 of the mating tube 330, and is tapered with a tapered internal sidewall 400. The lower tapered portion of the mating tube passage 335 has a length about equal to that of the tapered portion of the insert, but tapers somewhat more rapidly than the insert 305. Stated a different way, the mating tube passage 335 narrows faster than the insert 305 as one moves downward on these elements.

Due to this difference in tapering, the act of forcing the insert 305 further into the mating tube passage 335 causes the tapered external sidewall 355 of the insert 305 to press against the tapered internal sidewall 400 of the mating tube passage 335 so as to cause the mating tube 330 to expand laterally (i.e., bulge or flare outward). This expansion causes the narrower lower portion 390 of the mating tube 330 to expand outwardly against and just below the aperture 325, as shown in FIGS. 9 and 10. So expanded, the mating tube 330 creates a shoulder that inhibits removal of the mating tube 330 from the aperture 325. The mating tube 330 is thereby locked into the aperture 325 via a mechanical interference fit. At the same time, with the insert 305 fully seated, the flange 345 of the insert 305 sits substantially flush against an upper surface 410 of the diffuser body 300, as shown in FIG. 9.

With the elements designed as described above, an installer may install the diffuser body 300 onto the distribution conduit 310 by following a rather simple sequence of operations. Initially, the aperture 325 is formed by drilling a hole into the distribution conduit 310 with a diameter just slightly larger than the outside diameter of the narrower distal portion 390 of the mating tube 330. The distal portion 390 of the mating tube 330 is then inserted into the aperture 325 with little required force until the wider proximal portion 385 of the mating tube rests, or nearly rests, on top of the distribution conduit 310. Optionally, the mating tube 330 may be coated in a lubricant (e.g., polytetrafluoroethylene) or the aperture may be heated to aid in the insertion. Next, the insert 305 is dropped into the mating tube passage 335 and the forcing means 380 (e.g., hammer) is utilized to force the insert 305 downward into the mating tube passage 335 until the insert 305 becomes fully seated. With the insert fully seated, the expanded mating tube 330 inhibits removal of the mating tube 330 from the distribution conduit 310. The insert channel 360 of the insert 305 is in gaseous communication with the inside of the distribution conduit 310, and allows the diffuser assembly (with the required diffuser membrane) to function to form bubbles.

The retaining ridges 365 on the insert 305 help to assure that the insert 305 stays in place in the mating tube 330. The downward-facing surfaces 375 of the retaining ridges 365 allow the insert 305 to be readily inserted downward into the mating tube passage 335 towards the distribution conduit 310, but the upward-facing surfaces 370 bite against the vertical internal sidewall 395 of the mating tube passage 335 so as to inhibit the insert 305 from traveling upward out of the mating tube passage 335. This helps to assure that the insert 305 does not "walk" upward in the mating tube 330 and allow the diffuser body 300 to become loose on the distribution conduit 310. Such loosening is of particular concern because diffuser assemblies and distribution conduits are often subjected to vibration during operation in wastewater treatment applications.

The above-described exemplary diffuser body 300, insert 305, distribution conduit 310, and, more generally, embodiments in accordance with aspects of the invention, thereby provide solutions for mounting diffuser bodies to distribution conduits with several advantages. These solutions, for example, allow diffuser assemblies to be readily mounted in the field with just a few parts and by labor less skilled than that needed to mount conventional diffuser assemblies. Tool requirements are little more than a drill and a hammer. Embodiments in accordance with aspects of the invention may be utilized as a principle method of mounting diffuser assemblies to distribution conduits when wastewater treatment systems are being installed, and/or as a method of quickly replacing diffuser assemblies in existing systems when defects are discovered.

Once understood from the teachings set forth herein, the diffuser body 300, the insert 305, and the distribution conduit 310 may be formed from conventional materials utilizing conventional manufacturing techniques that will already be familiar to one having ordinary skill in the relevant arts. The insert 305 may, for example, comprise stainless steel. When choosing materials for the diffuser body 300 and the distribution conduit 310, the diffuser body 300 is preferably formed of a material that is softer than the material forming the distribution conduit 310. This allows the mating tube 330 to effectively expand against the aperture 325 of the distribution conduit 310 without deforming the aperture 325.

The diffuser body 300 may be formed of a material that is naturally softer than that forming the distribution conduit 310, or the diffuser body 300 may be physically or chemically altered so it is somewhat softer than the distribution conduit 310. In some embodiments, for example, the diffuser body 300 may be formed of polypropylene or polyethylene, while the distribution conduit 310 is formed of polyvinylchloride or stainless steel. Polyethylene and polypropylene are the most common materials utilized to form diffuser bodies for diffuser assemblies. Both materials are typically softer than stainless steel and polyvinylchloride. Polyethylene and polypropylene are also less expensive to produce, produce less hazardous waste when manufactured, and have higher temperature tolerances and impact resistances than polyvinylchloride. It is further noted that it is very difficult to chemically bond either polyethylene or polypropylene to polyvinylchloride, thereby producing a need for a mechanical attachment solution of the kind set forth herein.

Nonetheless, this discussion of materials is solely illustrative, and it should, by no means, be interpreted as limiting the scope of the invention. In alternative embodiments, the diffuser body 300 may, as just a few more examples, comprise special forms of polypropylene (e.g., talc-filled polypropylene or glass-fiber-filled polypropylene) or may even comprise polyvinylchloride or acrylonitrile butadiene styrene. The distribution conduit 310, moreover, may comprise, as even further examples, polypropylene, polyethylene, or acrylonitrile butadiene styrene. In each case, the hardnesses (i.e., durometers) of these various materials may be tailored to the particular application by selecting an appropriate plasticizer additive. In this manner, a polyvinylchloride diffuser body may, for instance, be made to be softer than a polypropylene distribution conduit.

The illustrative embodiment of the invention shown in FIGS. 3-10 therefore teaches aspects of an apparatus in which a distribution conduit defines an aperture, and a diffuser body defines a mating tube. At least a portion of the mating tube passes through the aperture, and the mating tube defines a mating tube passage therethrough having an inside sidewall. When disposed inside the mating tube passage so as to be fully seated, the insert presses against the inside sidewall of the mating tube to cause the mating tube to expand against and just below the aperture. Removal of the mating tube from the distribution conduit is thereby inhibited. Nevertheless, it should again be emphasized that the above-described embodiment of the invention is intended to be illustrative only. Other embodiments can use different types and arrangements of elements for implementing the described functionality. These numerous alternative embodiments within the scope of the appended claims will be apparent to one skilled in the art.

Figure 11:
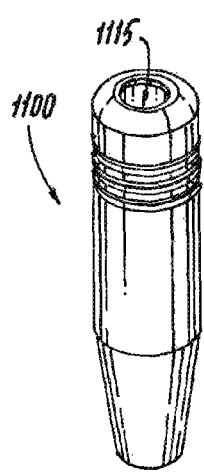
FIG. 11 shows a perspective view of an alternative insert for use with the FIG. 3 diffuser body and distribution conduit, in accordance with another illustrative embodiment of the invention.
Figure 12:
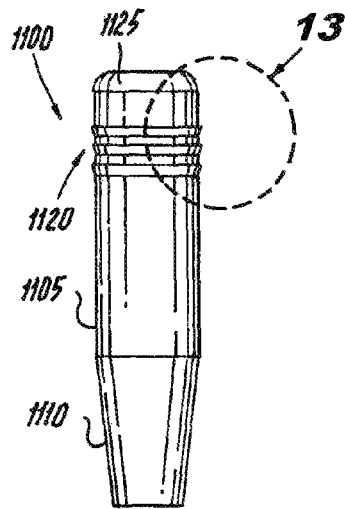
FIG. 12 shows a side elevational view of the FIG. 11 alternative insert.
Figure 13:
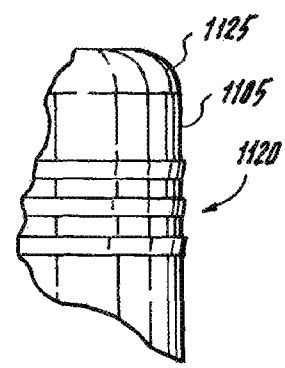
FIG. 13 shows a magnified side elevational view of the region indicated in FIG. 12.

Inserts in alternative embodiments falling within the scope of the invention may, for instance, have shapes different from that of the insert 305. As just one example, FIGS. 11-13 show aspects of an alternative insert 1100 that may be used with the same diffuser body 300 shown in FIGS. 3, 4, and 8-10. FIG. 11 shows a perspective view of the alternative insert 1100, while FIG. 12 shows a side elevational view thereof, and FIG. 13 shows a magnified side elevational view of the portion of the alternative insert 1100 indicated in FIG. 12. The alternative insert 1100 is somewhat similar to the insert 305 in that the alternative insert 1100 defines an upper cylindrical portion with a vertical external sidewall 1105 that is disposed atop a lower tapered portion with a tapered external sidewall 1110. The alternative insert 1100 also includes an insert channel 1115 and retaining ridges 1120. Nevertheless, the alternative insert 1100 does not include a flange like the flange 345 at its top in the manner of the insert 305. Rather, that feature is replaced in the alternative insert 1100 by a rounded top edge 1125.

Figure 14:
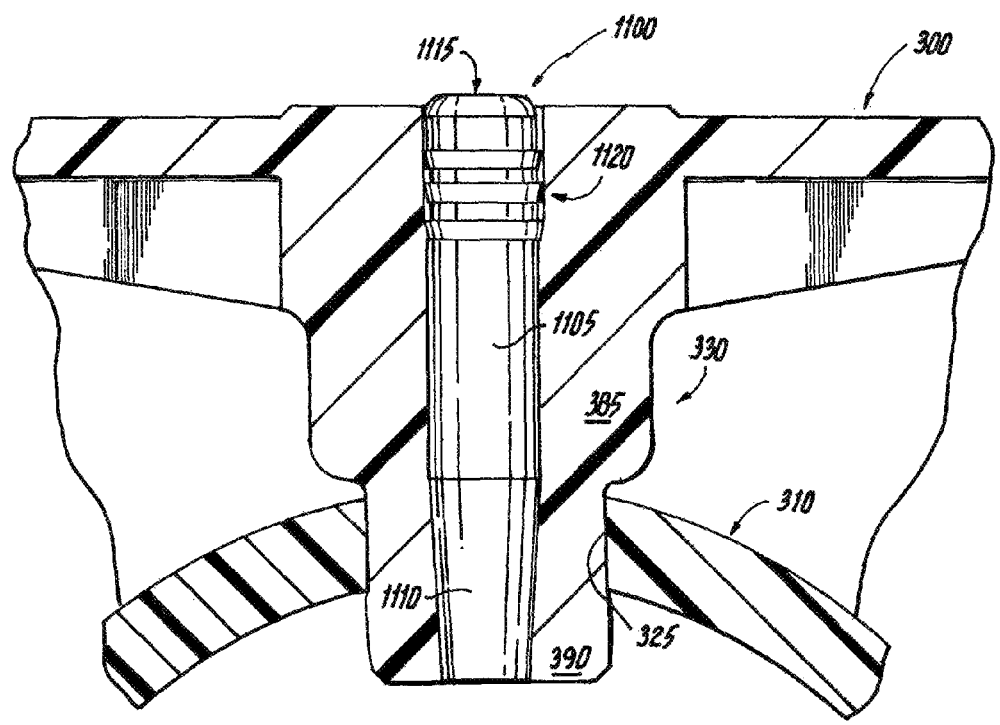
FIG. 14 shows a partially-broken side elevational view of the FIG. 11 alternative insert seated in the FIG. 13 diffuser body and distribution conduit.

The alternative insert 1100 interacts with the diffuser body 300 in much the same way as the insert 305. FIG. 14 shows a partially-broken side elevational view of the diffuser body 300 mounted to the distribution conduit 310 utilizing the alternative insert 1100. In this figure, the alternative insert 1100 is fully seated in the mating tube passage 335 so as to cause the mating tube 330 to expand against and below the aperture 325 in the distribution conduit 310. Here again, this bulging of the mating tube 330 locks the mating tube 330 into the distribution conduit 310.

Figures 15, 16:
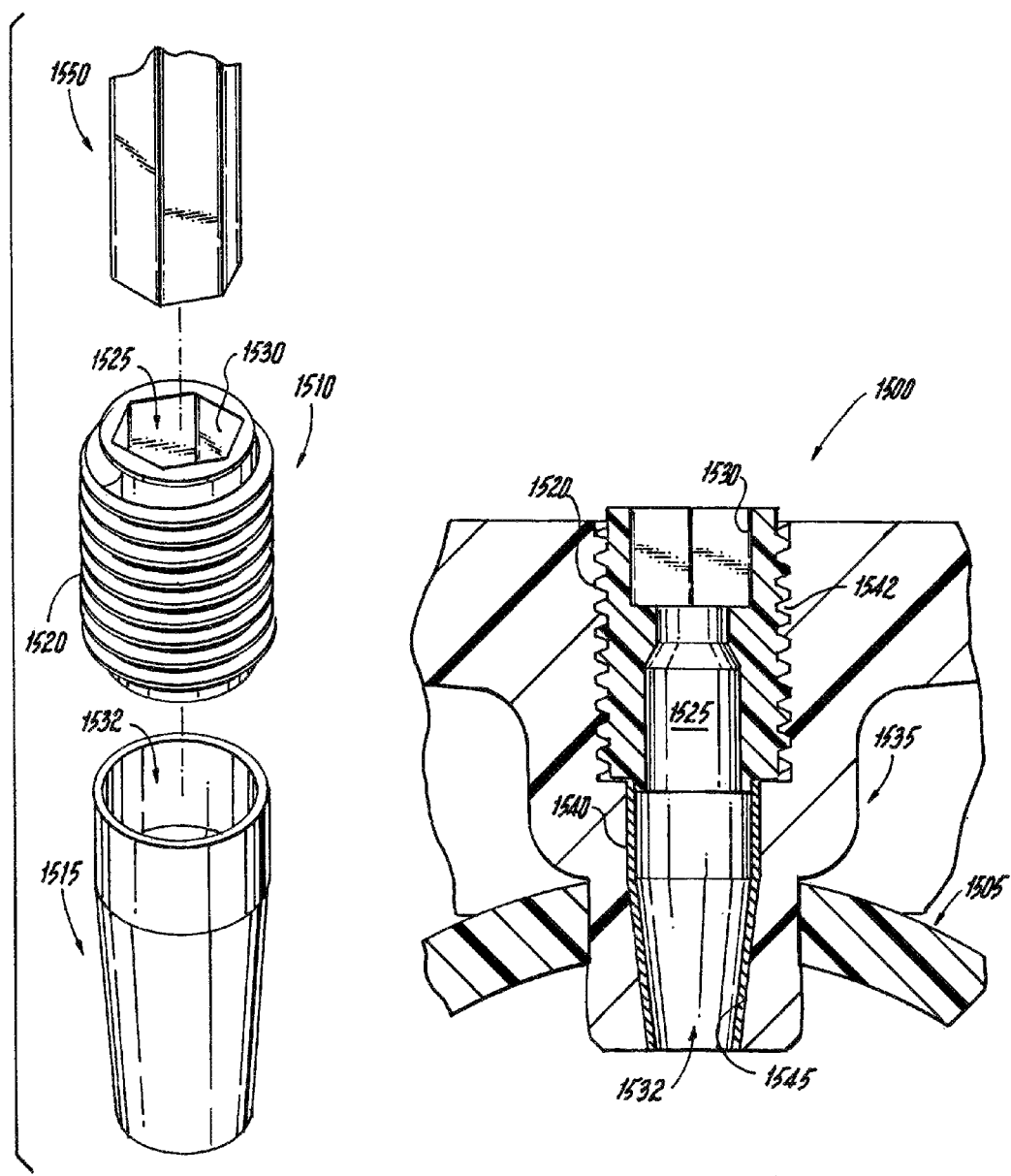
FIG. 15 shows an exploded perspective view of a two-part insert, in accordance with even another illustrative embodiment of the invention.
FIG. 16 shows a sectional view of a diffuser body mounted to a distribution conduit using the FIG. 15 two-part insert.

Other embodiments in accordance with aspects of the invention may also utilize multi-part inserts in combination with diffuser bodies having modified mating tubes to achieve the desired functionality. FIGS. 15 and 16, for example, show aspects of a diffuser body 1500 mounted to a distribution conduit 1505 using a two-part insert, in accordance with another illustrative embodiment of the invention. FIG. 15 shows an exploded side perspective view of the two-part insert, while FIG. 16 shows a sectional view of the diffuser body 1500 mounted to the distribution conduit 1505 utilizing the two-part insert.

The two-part insert includes an upper insert part 1510 and a lower insert part 1515. These parts 1510, 1515 are discrete and separable from one another, but work in combination with one another to facilitate the desired functionality. The upper insert part 1510 is cylindrical and defines external threads 1520 as well as an upper internal passage 1525 that passes through it. In the present embodiment, the upper internal passage 1525 is necked down at one point to give the desired conductance. At the same time, the upper internal passage 1525 terminates in a hexagonal opening 1530 at the top of the upper insert part 1510. The lower insert part 1515 is also cylindrical, but is devoid of threads. About the top third of the lower insert part 1515 defines a vertical sidewall, while the remainder defines a tapered sidewall. A lower internal passage 1532 passes through the lower insert part 1515.

Externally, the diffuser body 1500 is almost identical to the diffuser body 300. A mating tube 1535 of the diffuser body 1500, however, is modified to accommodate the two-part insert. An upper portion of a mating tube passage 1540 in the mating tube 1535 is adapted to receive the upper insert part 1510 of the two-part insert, and defines threads 1542 complementary to those on the upper insert part 1510. The remainder of the mating tube passage 1540 has a shape similar to that of the mating tube passage 335. Here again, without the insert in place, a tapered inside sidewall 1545 tapers somewhat more rapidly than does the lower insert part 1515. As a result, forcing the lower insert part 1515 further downward into the mating tube passage 1540 causes the lower insert part 1515 to press against the tapered inside sidewall 1545 of the mating tube passage 1540 so as to cause the mating tube 1535 to expand laterally.

Mounting the diffuser body 1500 on the distribution conduit 1505 utilizing the two-part insert is straightforward. The mating tube 1535 of the diffuser body 1500 is inserted into an aperture in the distribution conduit 1505, and the lower insert part 1515 is dropped into the mating tube passage 1540. Without external force, the lower insert part 1515 only drops part way down. The upper insert part 1510 is then threaded into the threads 1542 of the mating tube passage 1540 and screwed in. The screwing action may be accomplished by utilizing, for example, a hex key 1550 (i.e., an Allen key) that fits into the hexagonal opening 1530 at the top of the upper internal passage 1525. As the upper insert part 1510 is screwed further into the mating tube passage 1540, it contacts and seats against the lower insert part 1515, and forces the latter part further downward into the mating tube passage 1540. Ultimately, with sufficient screwing, the lower insert part 1515 becomes fully seated, and the desired mating tube expansion is obtained, as shown in FIG. 16. The mating tube 1535 is then permanently fixated to the distribution conduit 1505. The upper internal passage 1525 and the lower internal passage 1532 combine to form an interior passage in the diffuser body 1500 that is in gaseous communication with the inside of the distribution conduit 1505.

Even another embodiment in accordance with aspects of the invention may utilize a very different two-part insert in combination with a diffuser body with a modified mating tube. FIGS. 17 and 18 show aspects of such an embodiment, with FIG. 17 showing a partially-broken exploded perspective view of a diffuser body 1700 mounted to a distribution conduit 1705 using a two-part insert, and FIG. 18 showing a sectional view of the same elements. The two-part insert includes a screw insert part 1710 and a wedge insert part 1715. The screw insert part 1710 resembles a hollow socket-head cap screw with a cap 1720 and a threaded shaft 1725, which define a vertical passage 1727 passing therethrough. The wedge insert part 1715 comprises a tapered cylinder with an internal channel 1730 defining a set of inside threads 1735. In contrast to the tapering seen in earlier embodiments, the wedge insert part 1715 is tapered such that its outside diameter gets gradually larger as one moves downward.

The diffuser body 1700 is externally almost identical to the diffuser body 300, but defines a mating tube 1738 with a modified cylindrical mating tube passage 1740. More particularly, the top of the mating tube passage 1740 is widened somewhat to receive the cap 1720 of the screw insert part 1710. The remainder of the mating tube passage defines a generally vertical sidewall 1742 without the insert parts 1710, 1715 in place. To allow the wedge insert part 1715 to expand the mating tube 1738, as described below, the minimum inside diameter of the mating tube passage 1740, without the insert parts 1710, 1715 in place, is smaller than the maximum outside diameter of the wedge insert part 1715.

So configured, the diffuser body 1700 may be attached to the distribution conduit 1705 by inserting the screw insert part 1710 through a top opening in the mating tube passage 1740 while, simultaneously, inserting the wedge insert part 1715 through a bottom opening in the mating tube passage 1740 until the two insert parts 1710, 1715 meet. The screw insert part 1710 may then be rotated to start the threads of the threaded shaft 1725 of the screw insert part 1710 into the inside threads 1735 of the wedge insert part 1715. The diffuser body 17100 and the insert parts 1710, 1715 may then be inserted into an aperture 1745 in the distribution conduit 1705, and the screw insert part 1710 further rotated to cause the wedge insert part 1715 to translate upward on the threaded shaft 1725. That is, the outside threads of the threaded shaft 1725 threadably engage the inside threads 1735 of the wedge insert part 1715 such that rotating the screw insert part 1710 causes the wedge insert part 1715 to translate along the threaded shaft 1725 in an upward direction, pulling the wedge insert part 1715 upward deeper into the mating tube passage 1740. As the wedge insert part 1715 gradually travels upward as the screw insert part 1710 is rotated, the wedge insert part 1715 presses against the vertical sidewall 1742 of the mating tube passage 1740 and causes the mating tube 1738 to expand laterally. Ultimately, the condition shown in FIG. 18 is achieved, with the mating tube 1738 expanded against and just below the aperture 1745 of the distribution conduit 1705. Removal of the diffuser body 1700 from the distribution conduit 1705 is thereby inhibited.

Figure 19:
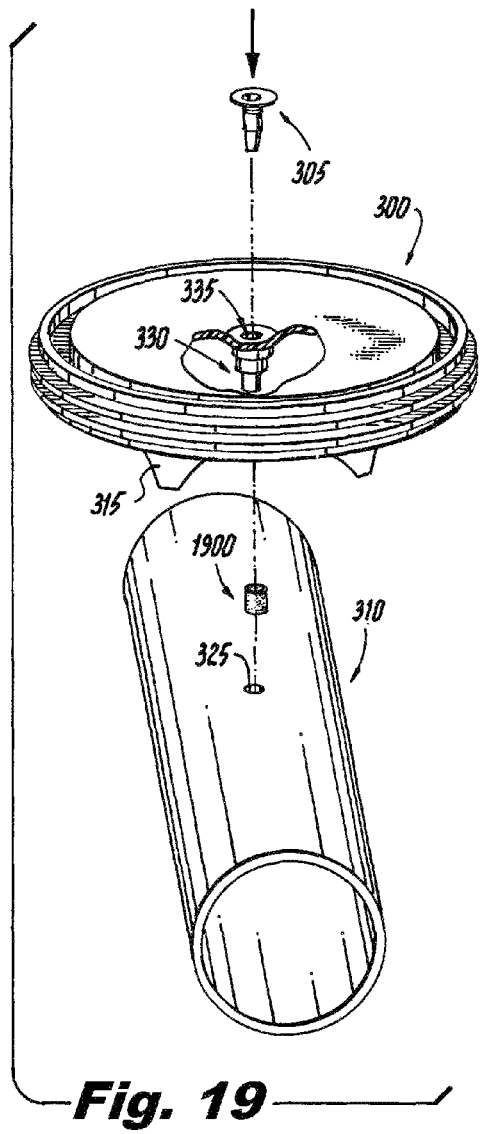
FIG. 19 shows a partially-broken exploded perspective view of the FIG. 3 elements with the addition of an optional sealing member.
Figure 20:
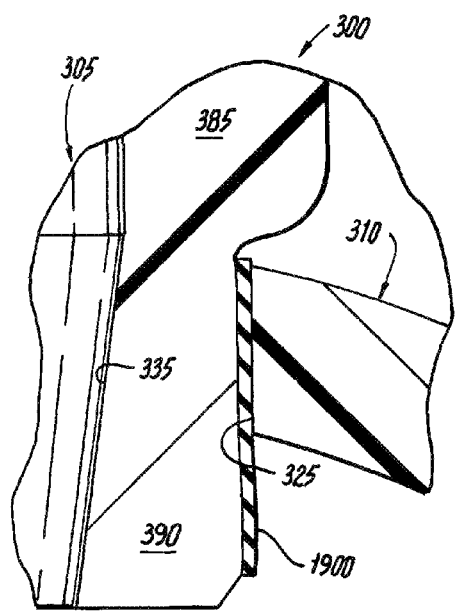
FIG. 20 shows a magnified partially-broken side elevational view of a region of the FIG. 19 elements.

An optional sealing ring may be added to any of the above-identified embodiments to enhance sealing of a mating tube to a distribution conduit. FIGS. 19 and 20 show the addition of a sealing ring 1900 to the assembly shown in FIG. 3, which comprises the diffuser body 300, the insert 305, and the distribution conduit 310. FIG. 19 shows an exploded perspective view of the assembly, while FIG. 20 shows a region of the assembly similar to that indicated in FIG. 9.

The sealing ring 1900 comprises a hollow cylindrical band dimensioned to surround the distal portion 390 of the mating tube 330. The sealing ring 1900 is preferably formed from an elastomeric material such as, but not limited to, highly saturated nitrile rubber or ethylene-propylene-diene-monomer rubber. The sealing ring may also be coated in a low-friction material (e.g., polytetrafluoroethylene). The sealing ring 1900 is placed over the distal portion 390 of the mating tube 330 before that portion is inserted into the aperture 325 of the distribution conduit 310. So placed, the sealing ring 1900 becomes compressed between the expanded mating tube 330 and the distribution conduit 310 when the insert 305 is seated in the mating tube passage 335. The compressed sealing ring 1900 further assures a tight seal between the diffuser body 300 and the distribution conduit 310, helping to reduce the possibility of loosening and leaks.

It is further noted that, while the illustrative embodiments set forth above utilize round apertures in the distribution conduits in combination with cylindrical mating tubes on the diffuser bodies, alternative embodiments coming within the scope of the invention may utilize alternative shapes. One or more embodiments, may, for example, utilize square apertures in the distribution conduits in combination with mating tubes and mating tube passages that are square columnar. Rather than describing the dimensions of these elements in terms of diameters, they may then be discussed in terms of widths. In even other embodiments, the aperture and mating tube may be elliptical in cross-section or may be polygonal with more than four sides.

Moreover, all the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

Any element in a claim that does not explicitly state "means for" performing a specified function or "step for" performing a specified function is not to be interpreted as a "means for" or "step for" clause as specified in AIA 35 U.S.C. §112(f). In particular, the use of "step of" in the claims herein is not intended to invoke the provisions of AIA 35 U.S.C. §112(f).

What is claimed is:

1. An apparatus comprising:
 a distribution conduit, the distribution conduit defining an aperture;
 a diffuser body, the diffuser body defining a mating tube, at least a portion of the mating tube passing through the aperture, and the mating tube defining a mating tube passage therethrough with an inside sidewall, a normally tapered portion of which is tapered when not pressed outward; and an insert, the insert at least partially disposed in the mating tube passage and defining an externally tapered portion pressing against the normally tapered portion of the inside sidewall so as to cause the mating tube to expand such that removal of the mating tube from the distribution conduit is inhibited.

2. The apparatus of claim 1, wherein the diffuser body further comprises an anti-torque projection, the anti-torque projection projecting from a surface of the diffuser body and defining a peripheral edge substantially conforming to an outside contour of the distribution conduit.

3. The apparatus of claim 1, wherein the distribution conduit is formed of a material harder than a material forming the mating tube.

4. The apparatus of claim 1, further comprising a sealing ring, the sealing ring comprising an elastomeric material, encircling at least a portion of the mating tube, and disposed between the mating tube and the distribution conduit.

5. The apparatus of claim 1, wherein:
the distribution conduit comprises at least one of steel, polyvinylchloride, polypropylene, polyethylene, and acrylonitrile butadiene styrene; and
the mating tube comprises at least one of polyethylene, polypropylene, polyvinylchloride, and acrylonitrile butadiene styrene.

6. The apparatus of claim 1, wherein the mating tube defines a proximal portion and a distal portion, the distal portion having a smaller outside diameter or width than the proximal portion.

7. The apparatus of claim 6, wherein the proximal portion has an outside diameter or width too large to fit through the aperture.

8. The apparatus of claim 1, further comprising a diffuser membrane, the diffuser membrane mounted to the diffuser body.

9. The apparatus of claim 1, wherein the insert defines an interior passage therethrough, the interior passage in gaseous communication with an inside of the distribution conduit.

10. The apparatus of claim 1, wherein:
the mating tube passage defines a set of inside threads;
the insert comprises a first insert portion and a second insert portion, the first insert portion being discrete and separable from the second insert portion;
the first insert portion defines a set of outside threads, at least a portion of the set of outside threads threadably engaged with at least a portion of the set of inside threads; and
the first insert portion presses against the second insert portion.

11. An apparatus comprising:
a distribution conduit, the distribution conduit defining an aperture;
a diffuser body, the diffuser body defining a mating tube, at least a portion of the mating tube passing through the aperture, and the mating tube defining a mating tube passage therethrough with an inside sidewall; and
an insert, the insert at least partially disposed in the mating tube passage and pressing against the inside sidewall so as to cause the mating tube to expand such that removal of the mating tube from the distribution conduit is inhibited;
wherein:
the insert comprises a first insert portion and a second insert portion, the first insert portion being discrete and separable from the second insert portion;
the first insert portion defines a shaft with a set of outside threads,
the second insert portion defines a channel with a set of inside threads;
the shaft at least partially occupies the channel, and at least a portion of the set of outside threads threadably engage at least a portion of the set of inside threads such that rotating the first insert portion causes the second insert portion to translate along the shaft; and
the second insert portion presses against the inside sidewall so as to cause the mating tube to expand such that removal of the mating tube from the distribution conduit is inhibited.

12. An apparatus for use in combination with a distribution conduit defining an aperture, the apparatus comprising:
a diffuser body, the diffuser body defining a mating tube, at least a portion of the mating tube adapted to pass through the aperture, and the mating tube defining a mating tube passage therethrough with an inside sidewall, a normally tapered portion of which is tapered when not pressed outward; and
an insert, the insert adapted to be at least partially disposed in the mating tube passage with at least a portion of the mating tube passing through the aperture, and defining an externally tapered portion adapted to press against the normally tapered portion of the inside sidewall so as to cause the mating tube to expand such that removal of the mating tube from the distribution conduit is inhibited.

13. The apparatus of claim 12, wherein the mating tube defines a proximal portion and a distal portion, the distal portion having a smaller outside diameter or width than the proximal portion.

14. The apparatus of claim 13, wherein the distal portion has a diameter or width smaller than that of the aperture when the insert is not disposed in the mating tube passage.

15. The apparatus of claim 12, wherein the diffuser body is adapted to support a diffuser membrane.

16. The apparatus of claim 12, wherein:
the mating tube passage defines a set of inside threads;
the insert comprises a first insert portion and a second insert portion, the first insert portion being discrete and separable from the second insert portion;
the first insert portion defines a set of outside threads; and
with at least a portion of the mating tube passing through the aperture and with at least a portion of the set of outside threads threadably engaging at least a portion of the set of inside threads, the first insert portion is adapted to press against the second insert portion inside the mating tube passage.

17. An apparatus for use in combination with a distribution conduit defining an aperture, the apparatus comprising:
a diffuser body, the diffuser body defining a mating tube, at least a portion of the mating tube adapted to pass through the aperture, and the mating tube defining a mating tube passage therethrough with an inside sidewall; and
an insert, the insert adapted to be at least partially disposed in the mating tube passage with at least a portion of the mating tube passing through the aperture, and to press against the inside sidewall so as to cause the mating tube to expand such that removal of the mating tube from the distribution conduit is inhibited;
wherein:
the insert comprises a first insert portion and a second insert portion, the first insert portion being discrete and separable from the second insert portion;

the first insert portion defines a shaft with a set of outside threads;

the second insert portion defines a channel with a set of inside threads; and with at least a portion of the mating tube passing through the aperture and with at least a portion of the set of outside threads threadably engaging at least a portion of the set of inside threads so that rotating the first insert portion causes the second insert portion to translate along the shaft, the second insert portion is adapted to be at least partially disposed in the mating tube passage and to press against the inside sidewall so as to cause the mating tube to expand such that removal of the mating tube from the distribution conduit is inhibited.

\* \* \* \* \*